(12) United States Patent
Schultz

(10) Patent No.: US 6,386,819 B1
(45) Date of Patent: May 14, 2002

(54) SELF-POWERED ELEVATIONALLY ADJUSTABLE FOLDABLE RAMP FOR DRAFT VEHICLES

(76) Inventor: Allan A. Schultz, Rte. 2 Box 79, New Richland, MN (US) 56072

( * ) Notice: Subject to any disclaimer, the term of this patent is extended or adjusted under 35 U.S.C. 154(b) by 0 days.

(21) Appl. No.: 09/506,175

(22) Filed: Feb. 17, 2000

(51) Int. Cl.[7] ............................................. B65G 67/02
(52) U.S. Cl. ..................... 414/537; 414/686; 14/71.7; 296/61
(58) Field of Search ................................. 14/69.5, 71.1, 14/71.7; 414/537, 538, 686; 296/61

(56) References Cited

U.S. PATENT DOCUMENTS

| | | |
|---|---|---|
| 3,516,560 A | 6/1970 | Brighton |
| 3,642,156 A | 2/1972 | Stenson |
| 3,726,423 A | 4/1973 | Miron |
| 3,779,411 A | 12/1973 | Moretti, Jr. |
| 3,799,479 A | 3/1974 | Roeder et al. |
| 3,834,565 A | 9/1974 | Goodman et al. |
| 3,977,545 A | 8/1976 | Lloyd |
| 4,005,788 A | 2/1977 | Ratliff |
| 4,305,694 A | 12/1981 | Chan |
| 4,372,727 A | 2/1983 | Fredrickson et al. |
| 4,498,836 A | 2/1985 | Love |
| 4,624,619 A | 11/1986 | Uher |
| 4,647,270 A * | 3/1987 | Maloney ................. 414/537 X |
| 4,685,857 A | 8/1987 | Goeser et al. |
| 4,906,041 A | 3/1990 | McKenzie |
| 4,932,829 A | 6/1990 | Miller |
| 4,979,865 A | 12/1990 | Strickland |
| 5,094,583 A | 3/1992 | Bills, Jr. et al. |
| 5,135,347 A * | 8/1992 | Kaczmarczyk et al. ..... 414/686 |
| 5,224,335 A | 7/1993 | Johns |
| 5,678,984 A | 10/1997 | Peterson |
| 5,697,754 A | 12/1997 | Raymer |
| 5,816,767 A | 10/1998 | Mann |

* cited by examiner

Primary Examiner—Frank E. Werner
(74) Attorney, Agent, or Firm—Schroeder & Siegfried, P.A.

(57) ABSTRACT

An elongated hydraulically foldable and elevationally adjustable ramp connectable to a draft vehicle and including leading and trailing ramp sections that are pivotally joined and foldable between an inclined loading position and an upright traveling position, and a ground-bearing pad pivotally connected and depending freely from the ramp at a position forward its center of gravity, such that upon activation of a hydraulic cylinder extending between the trailing and leading ramp sections when in loading position, the ground-bearing pad engages the ground and causes the forward end of the leading ramp section to elevate above the bed level of the trailer to facilitate mounting and removal of the ramp therefrom. The hydraulics for the ramp are self-contained on the ramp for independent operation and positional control without connection to an external source.

29 Claims, 6 Drawing Sheets

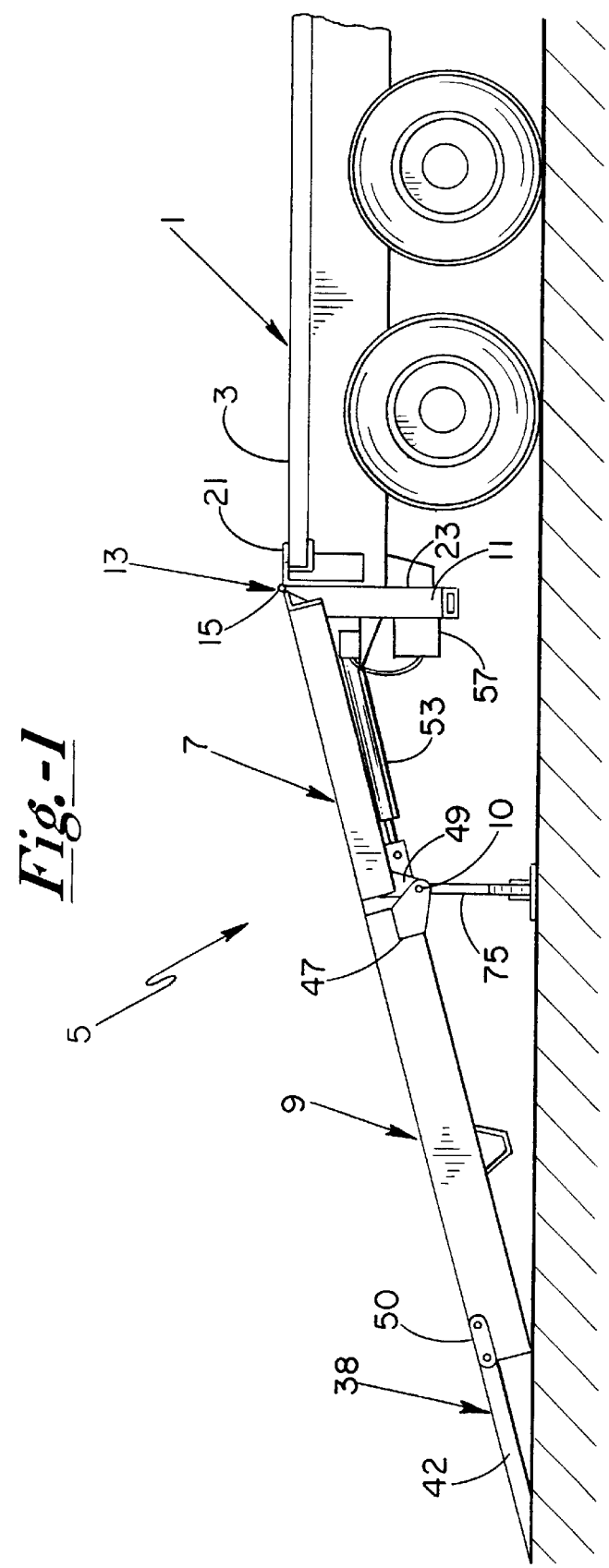

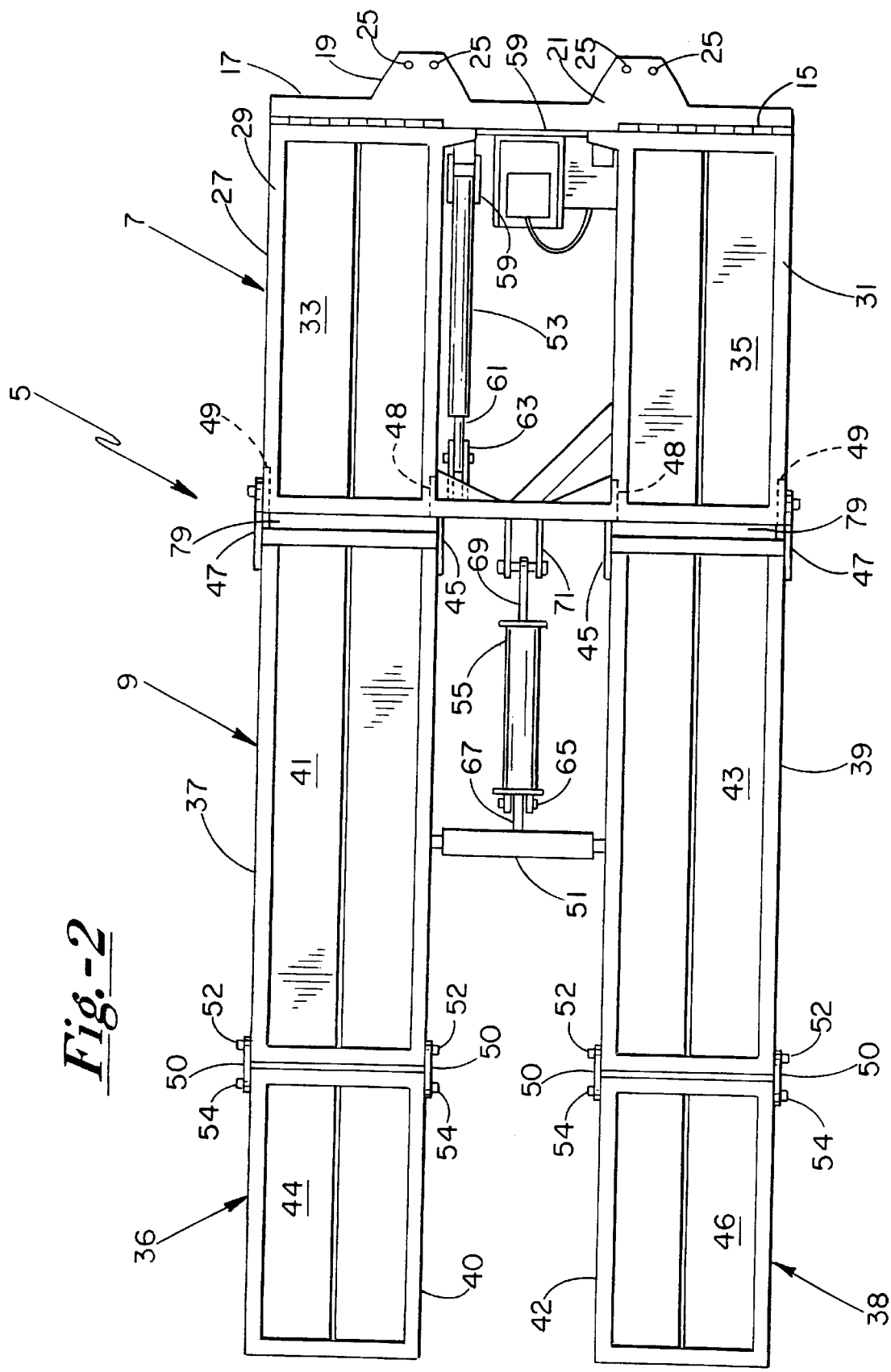

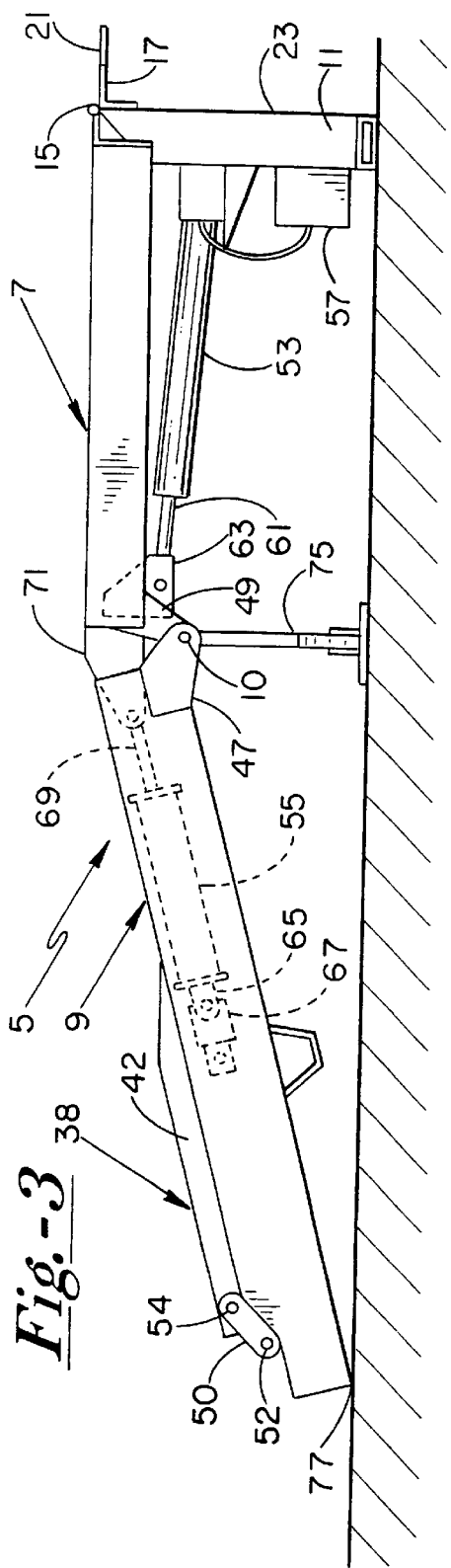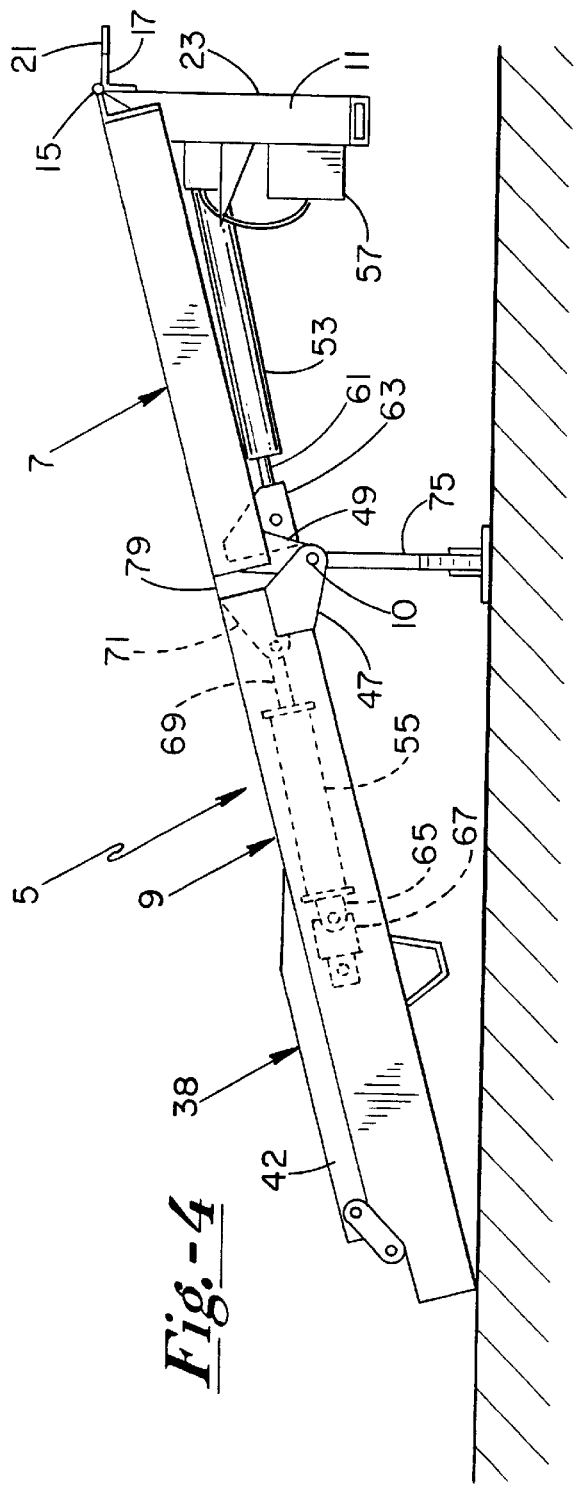

SELF-POWERED ELEVATIONALLY ADJUSTABLE FOLDABLE RAMP FOR DRAFT VEHICLES

BACKGROUND OF THE INVENTION

The present invention is related generally to the art of foldable trailer ramps, and more specifically to a readily removable and hydraulically powered foldable ramp which is intended for use in connection with standard general purpose draft vehicles, such as flatbed trailers.

Building contractors and others are, from day to day, continually faced with the problem of transporting large pieces of ground-moving equipment and machinery from one job site to another, in a cost-efficient and timely manner. This problem has lead many contractors to purchase highly specialized and expensive trailers for transporting such equipment. Such specialized trailers are generally constructed with an unusually low-profile trailer bed which enables the operator to use a relatively short ramp with a low angle of incidence to the ground for loading large pieces of equipment.

Such specialized trailers, however, are generally designed for the specific purpose of transporting large industrial equipment, and are not well suited for use in transporting other commonly used machinery and construction materials. While such trailers have been effective in enabling the efficient transport of such large equipment, the cost of such trailers is prohibitive in relation to that of a conventional flatbed trailer. Examples of such trailers can be found in U.S. Pat. Nos. 3,779,411; 4,305,694; and 4,372,727.

The fruition of such specialized trailers stems from problems experienced with the use of conventional flatbed trailers. The elevation of the bed of a standard flatbed trailer is such that, unless the connecting ramp is substantially lengthened, the grade of the ramp will be undesirably steep for loading such large equipment. While lengthening the ramp to lower its angle of incidence to the ground has been successfully implemented in the past, such ramps are generally excessive in weight and include multiple folding sections which are unduly cumbersome to manipulate between a loading and transport position. For this reason, such ramps are generally hydraulically controlled and permanently attached to the rear of the flatbed trailer to avoid the difficulty in manipulating the excessive load caused by the elongated ramp.

One foldable ramp which is detachable from a trailer bed is shown in U.S. Pat. No. 5,678,984. It is readily apparent, however, that such ramp, consisting of multiple foldable sections and constructed to be hydraulically operated, cannot be mounted or removed from the flatbed trailer without the use of additional power equipment or at least two workmen to lift and position the same for mounting on, or disconnection from, the rear of the flatbed trailer. Thus, such ramp is basically unusable unless sufficient manpower is present to mount or remove the same, which is oftentimes not the case.

Thus, there is a need for a foldable ramp which, when unfolded into a loading position, is of sufficient length to provide a low-grade ramp surface, while at the same time being readily mountable and removable from the rear of a flatbed trailer without the need for excessive manpower to accomplish the same. It is with this objective in mind that I have conceived of my new hydraulically foldable and elevationally adjustable ramp which incorporates a self-contained hydraulic power and control source for independent ramp positioning, to facilitate ease of mounting and removal thereof from the rear of a flatbed trailer.

BRIEF SUMMARY OF THE INVENTION

In accordance with the present invention, described herein is an elongated hydraulically foldable ramp having an elevational adjustment means for facilitating efficient connection and removal of the ramp to a conventional draft vehicle, such as a flatbed trailer. The ramp includes at least a pair of ramp sections, one section constituting a leading ramp section and the other section constituting a trailing ramp section. The forward end portion of the leading ramp section is constructed for pivotal connection to the rear of the flatbed trailer. The forward end portion of the trailing ramp section is pivotally joined with the rear end portion of the leading ramp section, thereby defining an axis of pivot about which the leading and trailing ramp sections may pivot for movement between a generally aligned, inclined loading position and a substantially upright, closely parallel traveling position.

The ramp further includes a ground-bearing pad which is pivotally connected and depends freely from the ramp at a point adjacent the axis of pivot between the leading and trailing ramp sections, and forward of the center of gravity of the ramp. This ground-bearing pad is thus inherently gravitationally positionable, and constructed and arranged such that it engages the ground and provides support to the ramp sections when the ramp is disposed in a loading or stored position. As will be explained hereafter, the ground-bearing pad is also instrumental in providing elevational adjustability of the forward end portion of the leading ramp section to facilitate mounting of the ramp to, and removal thereof from, the rear of a flatbed trailer.

As used herein and throughout the appended claims, the term "gravitationally positionable" is meant to convey the ability of the ground-bearing pad to inherently position itself through the effects of gravity thereon, as a result of its freely depending pivotal connection to the ramp.

Hydraulic operation and positional control of the leading and trailing ramp sections are controlled by a pair of hydraulic cylinders connected thereto. The first hydraulic cylinder is connected between the rear end portion of the leading ramp section and a generally vertically extending support member that is pivotally carried by and depends from the forward end portion of the leading ramp section. This cylinder, when activated, controls pivotal movement of the leading ramp section relative to the flatbed trailer when it is connected thereto.

The second hydraulic cylinder is pivotally connected between the trailing ramp section and the leading ramp section, and controls the relative pivotal movement therebetween. Activation of this cylinder in one direction causes the leading and trailing ramp sections to fold together into a transport position, and activation of such cylinder in the opposite direction, with the ramp in its inclined loading or stored position, causes elevational adjustment of the forward end portion of the leading ramp section in the manner described hereafter.

As noted earlier, the ground-bearing pad is connected to the ramp forward of its center of gravity. Thus, the majority of the ramp's weight is centered toward the rear of the ramp, and the ramp naturally tilts that direction when resting in its inclined loading position. Upon appropriate directional activation of the second hydraulic cylinder, the leading ramp section is caused to pivot relative to the trailing ramp section and raise the forward end portion thereof above the level of the flatbed trailer. Supported by the ground-bearing pad and counterbalanced by the weight of the ramp on the side of the trailing ramp section, the forward end of the leading ramp section will remain in an elevated position, allowing the trailer to either be positioned for mounting of the ramp, or disconnection of the ramp therefrom.

Whether the flatbed trailer is being positioned for mounting of the ramp, or disconnection therefrom, elevation of the forward end of the leading ramp section can be accomplished with minimal effort through the use of the ramp's own hydraulics. To further facilitate the mounting and removal of the ramp, the hydraulic power source for the ramp is self contained on the ramp for independent operation and positional control thereof. Because the ramp's hydraulics are devoid of connection to the flatbed trailer, both the ramp and the trailer may be freely adjusted and maneuvered separate from the other to effect proper positioning for mounting of the ramp to, and disconnection of the ramp from the flatbed trailer.

In order to extend the length of the ramp further, and consequently lower the grade of the ramp's incline, it is contemplated that an additional section may be pivotally connected to the rear end portion of the trailing ramp section. This extension ramp section is preferably smaller in size than the other ramp sections, and can be readily maneuvered by hand without the need for additional hydraulic controls.

With the forward end of the foldable ramp connected to and supported by the flatbed trailer, the ramp's hydraulics may then be activated to fold and unfold the leading and trailing ramp sections between an aligned, inclined loading position and a substantially upright transport position, as desired.

These and other objects and advantages of the invention will more fully appear from the following description, made in connection with the accompanying drawings, wherein like reference characters refer to the same or similar parts throughout the several views, and in which:

BRIEF DESCRIPTION OF THE DRAWINGS

FIG. 1 is a side elevational view of my self-powered elevationally adjustable foldable ramp, shown connected to the rear of a draft vehicle;

FIG. 2 is a top plan view of my self-powered elevationally adjustable foldable ramp, showing the construction thereof and operational hydraulic cylinders therefor;

FIG. 3 is a side elevation view of my self-powered elevationally adjustable foldable ramp, showing the ramp in its storage position, free from connection to a draft vehicle, and resting on its forward support member;

FIG. 4 is a side elevational view of my self-powered elevationally adjustable foldable ramp, similar to FIG. 3, wherein the forward end portion of the leading ramp section has been elevated to an inclined position, aligned with the trailing ramp section of the ramp;

DETAILED DESCRIPTION OF THE INVENTION

Figure 5:
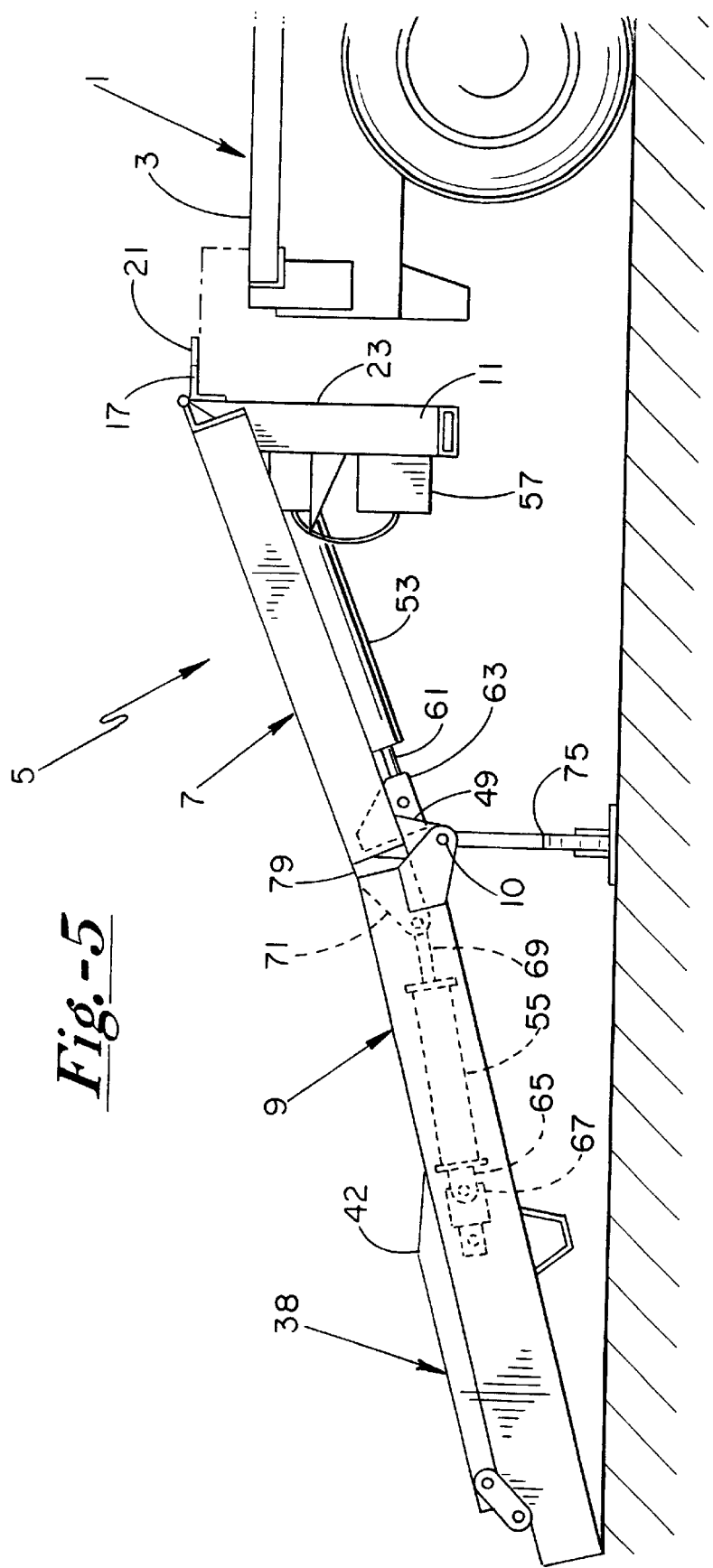
FIG. 5 is a side elevational view of my self-powered elevationally adjustable foldable ramp, similar to FIG. 4, wherein the forward end portion of the leading ramp section has been elevated to a position over-dead-center relative to the axis of the trailing ramp section, and above the level of the bed of a draft vehicle to facilitate connection thereto.

In accordance with the present invention, shown in FIG. 1 is a conventional draft vehicle or flatbed trailer 1 having a standard load bed 3 to which my improved hydraulically foldable and elevationally adjustable ramp 5 is connected. As can be seen throughout FIGS. 1–7, ramp 5 includes a plurality of ramp sections constituting at least a leading ramp section 7 and a trailing ramp section 9 which are pivotally interconnected along transverse axis 10 and foldable relative to one another.

The forward end portion of the leading ramp section 7 includes a depending support member 11 which extends vertically downward from and is pivotally connected thereto along transverse axis 13. As shown best in FIG. 2, a typical piano hinge 15 pivotally connects support member 11 to the forward end portion of leading ramp section 7.

Traversing the upper end of support member 11 is an outwardly extending flange 17 with protruding mounting plates 19 and 21. As shown best in FIGS. 1, 6 and 7, when trailer ramp 5 is connected to draft vehicle 1, the forward surface 23 of support member 11 is constructed to engage the rear end portion of draft vehicle 1 in ramp-supporting relation, with flange 17 and mounting plates 19 and 21 resting atop of bed 3 adjacent the rear end thereof. Mounting bolts (not shown) may then be inserted through mounting holes 25 in mounting plates 19 and 21 to engage cooperatively aligned mounting holes (not shown) in the rear end of trailer bed 3. For additional support of ramp 5, support member 11 may also be bolted to the rear end of draft vehicle 1 via the use of conventional U-bolts or other appropriate securing means.

As shown best in FIG. 2, leading ramp section 7 is comprised generally of an outer peripheral latticework 27, which is preferably constructed of steel. Latticework 27 defines a pair of transversely spaced elongated rectangular outer frame sections 29 and 31 that carry wheel runner tracks 33 and 35, respectively. Tracks 33 and 35 are preferably constructed of wood, or of another relatively rigid, weather-resistant material.

Similarly, trailing ramp section 9 is comprised of a pair of transversely spaced rectangular outer frame sections 37 and 39, which are also preferably constructed of steel, and carry in supporting relation elongated wheel runner tracks 41 and 43, respectively. Tracks 41 and 43 are also preferably constructed of wood, or of another relatively rigid, weather-resistant material.

As noted previously, trailing ramp section 9 is pivotally connected to leading ramp section 7 to facilitate foldable movement therebetween. The forward end portion of each of frame sections 37 and 39 of trailing ramp section 9 are pivotally connected to the rear end portion of latticework 27 of leading ramp section 7. Frame sections 37 and 39 each include inner and outer mounting plates, 45 and 47, which extend downwardly and forwardly therefrom to cooperatively mate with and pivotally connect to corresponding inner and outer mounting plates 48 and 49 secured to the rear portions of latticework 27 of leading ramp section 7. These pivotal connections cooperate in conjunction with crossbar 51 extending between trailing ramp frame sections 37 and 39 to hold the same in cooperatively aligned relation with frame sections 29 and 31 of leading ramp section 7.

As shown throughout the drawings, foldable ramp 5 includes a hydraulic operational system which is comprised of a pair of hydraulic cylinders 53 and 55, and a hydraulic power and control source 57. Preferably, as shown in the drawings, the hydraulic power and control source 57 is constructed to be self-contained on ramp 5 and fully operational independent of power from an external source. It will be appreciated, however, that ramp 5 could be powered via an external hydraulic power and control source and still be readily adjustable in the manner described herein.

The independent hydraulic power/control source 57 may be mounted to and carried by depending support member 11 of ramp 5. Hydraulic control lines (not shown) connect the hydraulic power source 57 with hydraulic cylinders 53 and 55 in a conventionally known manner. As shown best in FIG. 2, the base end of cylinder 53 pivotally connects to mounting bracket 59, which is fixedly secured to depending support member 11. Similarly, piston rod 61 of hydraulic cylinder 53 is pivotally mounted at its terminal end to mounting bracket 63, which is fixedly secured to the rear end portion of latticework 27 of leading ramp section 7. Thus, activation of hydraulic cylinder 53 in either direction will control the pivotal movement of leading ramp section 7 at hinge 15 about transverse axis of pivot 13.

In like manner, it can be seen that the base end 65 of hydraulic cylinder 55 pivotally connects to bracket 67, which is fixedly secured to crossbar member 51 extending between opposite frame sections 37 and 39 of trailing ramp section 9. The terminal end of piston rod 69 to hydraulic cylinder 55, however, pivotally mounts to mounting bracket 71, which is fixedly secured to and extends rearward from the rear end portion of latticework 27 of leading ramp section 7.

Notably, bracket 71 is disposed above axis of pivot 10 between the leading and trailing ramp sections 7 and 9, such that movement of piston rod 69 through activation of cylinder 55 will generate a torque on such ramp sections about axis 10. By so connecting hydraulic cylinder 55 in this manner, activation thereof in either direction will control the relative pivotal movement between leading ramp section 7 and trailing ramp section 9 about the transverse axis of pivot 10 therebetween. Although bracket 71 is shown in the preferred embodiment above axis 10, it will be appreciated that ramp 5 could alternatively be constructed such that the connection of piston rod 69 to leading ramp section 7 is below axis 10, and still provide the desired torque to cause the relative pivotal movement of ramp sections 7 and 9 about axis 10.

Figure 7:
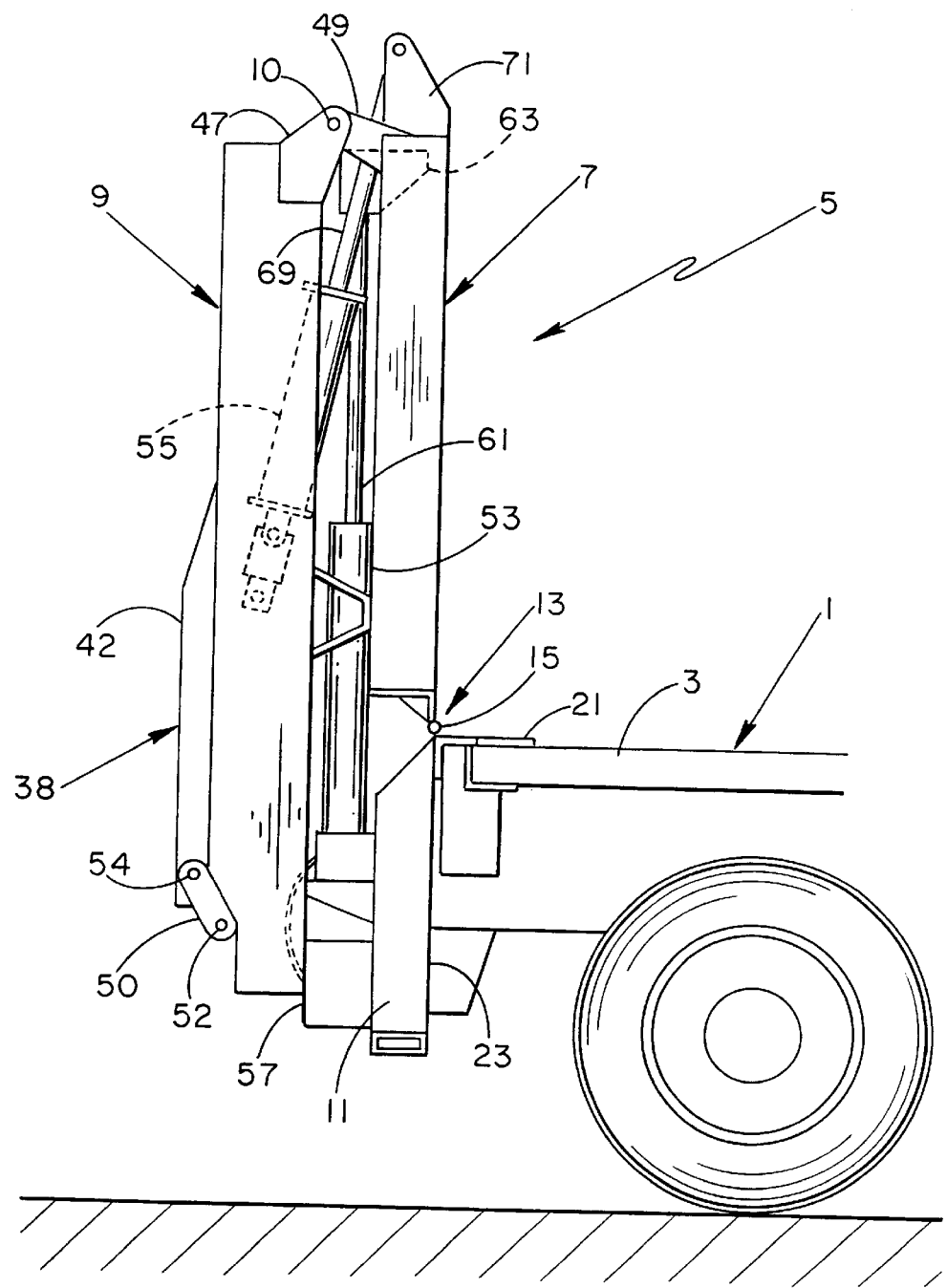
FIG. 7 is a side elevational view of my self-powered elevationally adjustable foldable ramp, shown connected to a draft vehicle in its folded upright transport position.

Optionally, additional extension ramps 36 and 38 may be pivotally connected to the rear end portions of the trailing ramp frame sections 37 and 39, respectively, thereby effectively increasing the length of ramp 5 and lowering the angle of incidence thereof to ground level. As shown in FIG. 2, similar to ramp sections 7 and 9, extension ramps 36 and 38 are preferably constructed with outer steel frame sections 40 and 42, which carry wheel runner tracks 44 and 46, respectively. Also, each extension ramp, 36 and 38, is pivotally mounted to trailing ramp section 9 via mounting brackets 50 and multiple pivot pins 52 and 54. Unlike ramp sections 7 and 9, however, ramps 36 and 38 are significantly smaller and lighter in weight, and require no hydraulics to maneuver the same. Rather, extension ramps 36 and 38 are manually foldable between an inclined loading position, as shown in FIG. 1, and a substantially upright transport position, as shown in FIG. 7.

With reference now being made to FIGS. 3–5, it can be seen that foldable ramp 5 includes a free-swinging pivotal ground-bearing pad 75 which, as will be explained in more detail hereafter, is instrumental in providing elevational adjustability of leading ramp section 7 when mounting or disconnecting ramp 5 to or from bed 3 of draft vehicle 1. In particular, it can be seen that ground-bearing pad 75, by virtue of its inherent gravitational positioning characteristic, is constructed to extend between ramp 5 and the supporting ground structure when ramp sections 7 and 9 are unfolded relative to one another. In terms of providing the desired elevational adjustability of leading ramp section 7, for reasons explained hereafter, it is preferable that ground-bearing pad 75 support ramp 5 at a point forward of the center of gravity of ramp 5.

To this end, in the preferred embodiment shown in FIGS. 3–5, it can be seen that trailing ramp section 9 is constructed to be significantly longer than leading ramp section 7, such that the weight of ramp 5 rearward of the axis of pivot 10 is greater than the weight of ramp 5 forward of such point. Thus, the axis of pivot 10 between the leading and trailing ramp sections 7 and 9 is forward of the center of gravity of ramp 5, and ground-bearing pad 75 pivotally connects to and depends freely from ramp 5 at a point immediately adjacent thereto. Specifically, in the preferred embodiment, the upper end of ground-bearing pad 75 is pivotally connected along axis of pivot 10 between opposed inner mounting plates 45 and 48, in tandem with leading and trailing ramp sections 7 and 9. It will be appreciated, however, that ground-bearing pad 75 may be disposed elsewhere along the length of ramp 5, forward of its center of gravity, without significantly impeding the elevational adjustability thereof.

As shown in FIGS. 3–5, with ground-bearing pad 75 being positioned forward of the center of gravity of ramp 5, the weight of trailing ramp section 9 and extension ramps 36 and 38 will cause ramp 5 to tilt rearwardly relative to ground-bearing pad 75. Thus, upon activation of hydraulic cylinder 55 to draw piston rod 69 rearwardly, ground-bearing pad 75 will essentially function as a fulcrum, or leverage point, about which the lighter leading ramp section 7 may pivot. As can be seen best in FIGS. 4 and 5, when ramp 5 is freestanding, drawing piston 69 of hydraulic cylinder 55 rearwardly causes leading ramp section 7 to pivot about transverse axis 10, thereby raising the forward end portion thereof. Thus, while ramp 5 is freestanding, the elevation of the forward end portion of leading ramp section 7 may be positionally adjusted as desired, while the heavier trailing ramp section 9 remains stationary.

In operation, it can be seen from FIG. 3 that foldable ramp 5 may be stored apart from vehicle 1 in a readily accessible position for mounting when desired. In such a stored position, the rear end portion 77 of trailing ramp section 9 and ground-bearing pad 75 bear against the ground surface to support the rear and middle portions of foldable ramp 5, respectively. With piston rod 69 of hydraulic cylinder 55 extended slightly, the forward end portion of leading ramp section 7 is allowed to pivot downwardly until depending support member 11 engages the ground surface in supporting relation thereto. Notably, in this position, hydraulic cylinder 53 will hold support member 11 steadfast in its supportive position, and prevent the same from free rotation about hinge 15.

From the position shown in FIG. 3, mounting of foldable ramp 5 to vehicle 1 may be carried out with minimal effort through the use of the ramp's own independent, self-contained hydraulic system 57. As shown in FIG. 4, by activating hydraulic cylinder 55 and drawing piston 69 rearward, a counterclockwise torque about axis 10 is applied to the rear end of leading ramp section 7. Leading ramp section 7 is thus caused to pivot about axis 10 in such manner as to raise the forward end portion thereof off the ground.

As shown in FIGS. 4 and 5, leading ramp section 7 and trailing ramp section 9 are constructed with sufficient clearance 79 therebetween to allow leading ramp section 7 to pivot upwardly to a position which is over-dead-center relative to the longitudinal axis of the trailing ramp section 9. Thus, as shown in FIG. 5, the forward end portion of leading ramp section 7 is easily elevated through the ramp's own hydraulics to a position which exceeds the elevation of the surface of bed 3 of vehicle 1. This facilitates the ability to back vehicle 1 into proper position for mounting of ramp 5 thereto, with no need for additional manual labor. Once vehicle 1 is properly positioned, reversal of hydraulic cylinder 55 will allow the forward end of leading ramp section 7 to lower to its proper mounting position, as shown in FIG. 1, where mounting plates 19 and 21 of flange 17 may rest on bed 3 of the trailer, and be secured thereto.

As is readily apparent, disconnection of foldable ramp 5 from draft vehicle 1 may also be accomplished with minimal manpower by simply reversing the procedure used in mounting the ramp thereto. Briefly, after removing all connections between vehicle 1 and foldable ramp 5, hydraulic cylinder 55 may be activated to draw piston rod 69 rearward, thereby causing the forward end of leading ramp section 7 to raise back into the position shown in FIG. 5. Upon removal of vehicle 1 from beneath flange 17 and mounting plates 19 and 21 of ramp 5, hydraulic cylinder 55 may be reversed to extend piston rod 69 outward so as to cause leading ramp section 7 to pivot downward about axis 10 to the storage position shown in FIG. 3.

Figure 6:
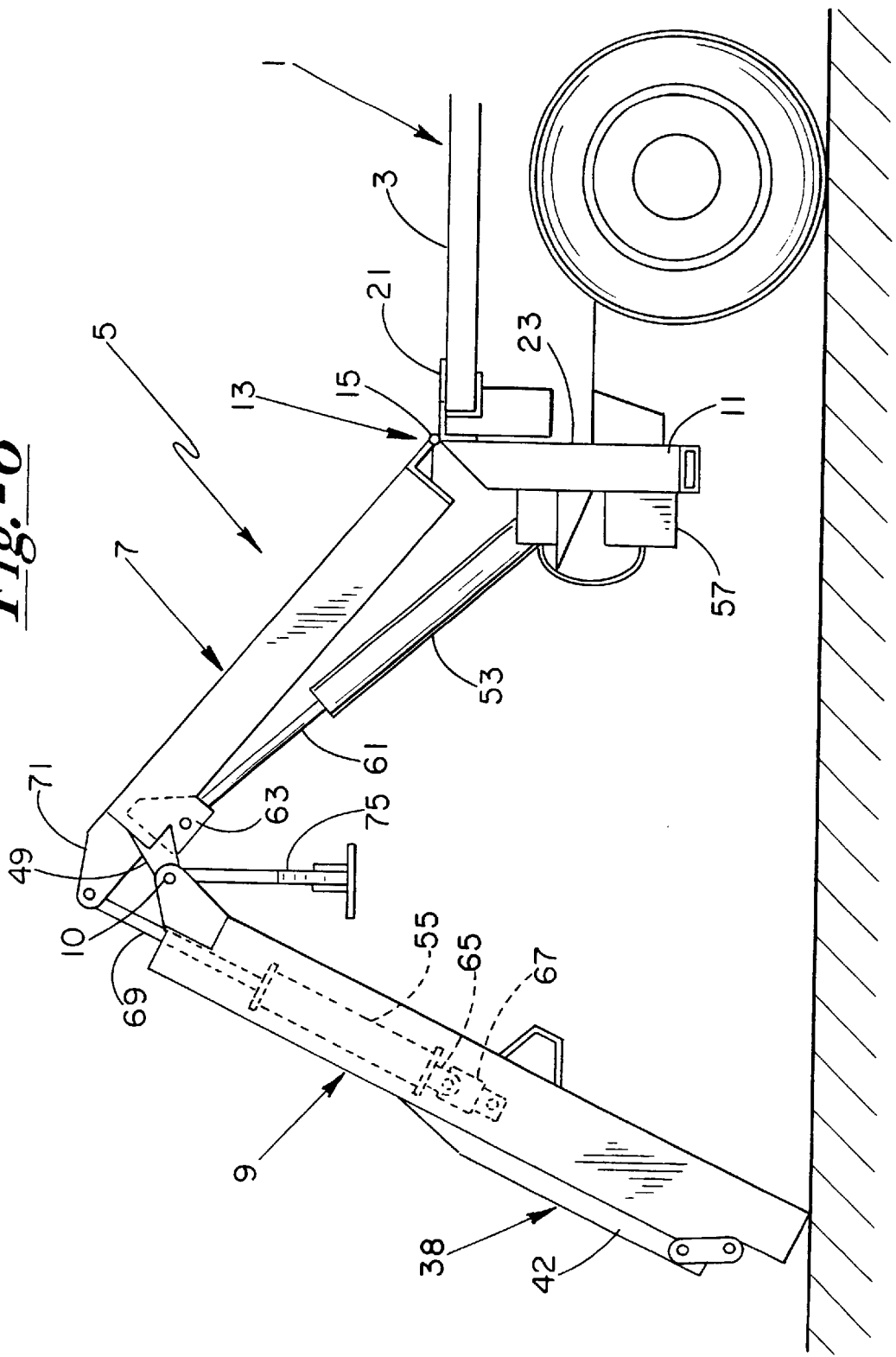
FIG. 6 is a side elevational view of my self-powered elevationally adjustable foldable ramp, shown connected to a draft vehicle, and partially folded between an aligned, inclined loading position and a substantially upright transport position.

With foldable ramp 5 mounted to bed 3 of vehicle 1, hydraulic system 57 may be utilized to fold ramp 5 from its generally inclined loading position, as shown in FIG. 1, to a substantially upright traveling position, as shown in FIG. 7. Specifically, as shown in FIG. 6, when foldable ramp 5 is connected to the flatbed trailer 1, energizing hydraulic cylinder 53 to extend piston rod 61 outwardly will cause the rear end portion of leading ramp section 7 to elevate and pivot upwardly relative to axis 13 at the point of connection of ramp 5 to trailer bed 3. Similarly, activation of cylinder 55 to cause piston rod 69 to extend outwardly therefrom will cause trailing ramp section 9 to pivot relative to the leading ramp section 7 in such manner as to cause the two ramp sections to fold together. Continued activation of hydraulic cylinders 53 and 55, as such, will cause foldable ramp 5 to fold into a substantially upright transport position, as shown in FIG. 7.

It will be appreciated that similar activation of hydraulic cylinders 53 and 55 may be made in the reverse direction, thereby drawing the respective piston rods 61 and 69 inward, and causing the leading and trailing ramp sections, 7 and 9, to extend outwardly into their inclined loading positions, as shown in FIG. 1. Manual operation of the smaller extension ramps 36 and 38 to their inclined loading position may then be made manually to provide a smooth transition onto foldable ramp 5, at a relatively low angle of incidence to the ground.

From the foregoing, it is readily apparent that, regardless of whether the draft vehicle 1 is being positioned for mounting of ramp 5, or disconnection of ramp 5 therefrom, the elevation of the forward end of the leading ramp section 7 can be positionally adjusted with minimal effort and with no appreciable manual labor through the use of the ramp's own hydraulic system 57. By constructing the hydraulic system 57 to be independently self-contained on ramp 5 and devoid of connection to vehicle 1, both the ramp 5 and the vehicle 1 may be freely adjusted and maneuvered separate from each other to effect proper positioning for mounting and disconnection of ramp 5 to and from bed 3. With ramp 5 so constructed to allow use of the hydraulic system 57 for elevationally adjusting the forward end portion of the leading ramp section 7 relative to bed 3 of vehicle 1, the once laborious procedure of manually mounting and disconnecting such a ramp 5 is significantly simplified and improved.

It will, of course, be understood that various changes may be made in the form, details, arrangement and proportions of the parts without departing from the scope of the invention which comprises the matter shown and described herein and set forth in the appended claims.

What is claimed is:

1. An elevationally adjustable ramp which, by interior adjustment, is capable of facilitating mounting and disconnection thereof relative to a draft vehicle, comprising:
    (a) an elongated ramp having a forward end portion and a rear end portion, said forward end portion being constructed and arranged to be pivotally connected to the draft vehicle in readily removable relation thereto;
    (b) a generally vertically extending ground-bearing member carried by said ramp and depending freely therefrom in gravitationally positionable supporting relation thereto when said ramp rests in an inclined loading position relative to such a draft vehicle;
    (c) a hydraulically controlled adjustment means connected to said ramp for causing elevational adjustment of said forward end portion of said ramp relative to such a draft vehicle to facilitate mounting of said ramp to, and disconnection of said ramp from, such a draft vehicle;
    (d) hydraulic control means carried by said ramp and connected thereto in controlling relation for controlling pivotal movement of said ramp between an inclined loading position and a substantially upright traveling position when connected to such a draft vehicle; and
    (e) a hydraulic power source mounted on said ramp and controllably connected to said hydraulic adjustment means and said hydraulic control means for providing interior self-contained operational hydraulic control of said ramp.

2. The elevationally adjustable ramp defined in claim 1, wherein said ramp is foldable and includes at least a pair of pivotally connected ramp sections, one of said ramp sections constituting a leading section and the other section constituting a trailing section.

3. The elevationally adjustable ramp defined in claim 2, wherein said adjustment means includes a hydraulic cylinder connected between said leading and trailing ramp sections, whereby activation of said hydraulic cylinder when said ramp is in said inclined loading position causes said forward end portion of said ramp to elevate to a position which facilitates the mounting of said ramp to, or the disconnection of said ramp from, such a draft vehicle.

4. The elevationally adjustable ramp defined in claim 3, wherein said hydraulic power source is devoid of connection to an external power source and is self-contained with said ramp for independent operation thereof.

5. An elevationally adjustable ramp which, by interior adjustment, is capable of facilitating mounting and disconnection thereof relative to a draft vehicle, comprising:
    (a) an elongated foldable ramp having at least a pair of ramp sections, one of said ramp sections constituting a leading section and the other section constituting a trailing section;
    (b) said leading ramp section having a forward end portion and a rear end portion, said forward end portion being constructed and arranged to be connected to the draft vehicle in readily removable relation thereto;

(c) said trailing ramp section having a forward end portion and a rear end portion, said forward end portion of said trailing ramp section being pivotally secured to said rear end portion of said leading ramp section, thereby defining an axis of pivot therebetween transverse to said ramp and about which said ramp sections may pivot;

(d) a hydraulic cylinder controllably connected between said trailing and leading ramp sections to control the relative pivotal movement between said trailing and leading ramp sections about said axis of pivot;

(e) a hydraulic power source mounted on said ramp and controllably connected to said hydraulic cylinder and constituting therewith interior adjustment means whereby the mounting upon or the disconnection of said leading ramp section from such a draft vehicle may be readily facilitated;

(f) a ground-bearing pad pivotally connected to and depending freely from said ramp at a point adjacent said axis of pivot between said leading and trailing ramp sections, and forward of a center of gravity of said ramp, said pad being gravitationally positionable and constructed and arranged to engage the ground and support said ramp sections when said ramp sections are disposed in a generally aligned inclined loading position;

(g) said ground-bearing pad, when engaging the ground, constituting a fulcrum upon activation of said hydraulic cylinder, to thereby change the elevation of said forward end portion of said leading ramp section to a position which facilitates the mounting upon or the disconnection of said leading ramp section from such a draft vehicle; and (h) said change of elevation of said front end of said leading ramp section being accomplished by relative movement of said ramp sections about only said transverse axis of pivot therebetween.

6. The elevationally adjustable ramp defined in claim 5, wherein said ground-bearing pad is located and supports said ramp at the axis of pivot between said leading and trailing ramp sections.

7. The elevationally adjustable ramp defined in claim 5, and a draft vehicle which includes a load bed, and said ground-bearing pad, when engaging the ground, defines a fulcrum about which said leading ramp section will pivot upon activation of said hydraulic cylinder, to cause said forward end portion of said leading ramp section to raise from a lower storage position to a position above the level of said load bed, and thereby facilitate the mounting of said leading ramp section upon said load bed of said draft vehicle, or the removal of the leading ramp section therefrom.

8. The elevationally adjustable ramp defined in claim 5, wherein said forward end portion of said leading ramp section is constructed and arranged to be pivotally connected to such a draft vehicle.

9. The elevationally adjustable ramp defined in claim 8, including a second hydraulic cylinder controllably powered by said hydraulic power source and connected in controlling relation to said leading ramp section to cause controlled pivotal movement of said leading ramp section at said forward end portion thereof when pivotally connected to such a draft vehicle.

10. The elevationally adjustable ramp defined in claim 9, wherein said leading and trailing ramp sections are both constructed and arranged for pivotal movement about said axis of pivot and said pivotal connection to such a draft vehicle for foldable movement between said aligned, inclined loading position and a substantially upright traveling position.

11. The elevationally adjustable ramp defined in claim 8, wherein said leading and trailing ramp sections are foldably movable between said aligned, inclined loading position and a substantially upright, generally closely parallel traveling position.

12. The elevationally adjustable ramp defined in claim 5, wherein said trailing ramp section is heavier than said leading ramp section.

13. The elevationally adjustable ramp defined in claim 5, including a ramp-extension means carried by said rear end portion of said trailing ramp section.

14. The elevationally adjustable ramp defined in claim 13, wherein the combined weight of said ramp-extension means and said trailing ramp section is greater than the weight of said leading ramp section.

15. The elevationally adjustable ramp defined in claim 5, wherein said trailing ramp section is slightly spaced longitudinally from said leading ramp section adjacent said axis of pivot to accommodate relative pivotal movement of one of said ramp sections relative to the other in either rotational direction.

16. The elevationally adjustable ramp defined in claim 5, including a generally vertically extending support member carried by said forward end portion of said leading ramp section and depending therefrom in supporting relation thereto when said foldable ramp is free from such a flatbed trailer.

17. The elevationally adjustable ramp defined in claim 16, wherein said support member is pivotally connected to said forward end portion of said leading ramp section.

18. The elevationally adjustable ramp defined in claim 16, wherein said hydraulic power source is carried by said support member and is independent from and devoid of hydraulic powered connection to such a flatbed trailer.

19. An elevationally adjustable ramp which, by interior adjustment, is capable of facilitating mounting and disconnection thereof relative to a draft vehicle having a load bed, comprising:

(a) a foldable ramp having at least a pair of ramp sections, one of said ramp sections constituting a leading section and the other constituting a trailing section;

(b) said leading ramp section having a forward end portion and a rear end portion, said forward end portion being constructed and arranged to be pivotally connected to the draft vehicle in readily removable relation thereto;

(c) said trailing ramp section having a forward end portion and a rear end portion, said forward end portion of said trailing ramp section being pivotally secured to said rear end portion of said leading ramp section, thereby defining an axis of pivot transverse to said ramp about which said leading and trailing ramp sections may pivot for movement between an aligned, inclined loading position and a substantially upright traveling position;

(d) a first hydraulic cylinder connected in controlling relation to said leading ramp section to cause controlled pivotal movement of said leading ramp section at said forward end portion thereof;

(e) a second hydraulic cylinder controllably connected between said trailing and leading ramp sections, to control the pivotal movement of one of said ramp sections relative to the other;

(f) a hydraulic power source mounted on said ramp and controllably connected to said first and second hydraulic cylinders and constituting therewith interior adjustment means whereby the mounting upon or the removal of said leading ramp section from such a draft vehicle may be readily facilitated;

(g) a ground-bearing pad pivotally connected to and depending freely from said ramp sections at a point adjacent said transverse axis of pivot between said leading and trailing ramp sections, and forward of a center of gravity of said ramp, said pad being gravitationally positionable and constructed and arranged to engage the ground and support said ramp sections when said ramp sections are disposed in said generally inclined loading position;

(h) said ground-bearing pad, when engaging the ground, constituting a fulcrum upon activation of said second hydraulic cylinder, to thereby change the elevation of said forward end portion of said leading ramp section to a position which facilitates mounting upon or removal of said leading ramp section from such a draft vehicle;

(i) said change of elevation of said front end of said leading ramp section being accomplished by relative movement of said leading and trailing ramp sections about only said transverse axis of pivot therebetween.

20. The elevationally adjustable ramp defined in claim 19, wherein said trailing ramp section is heavier than said leading ramp section, and said ground-bearing pad, when engaging the ground, constitutes a fulcrum about which said leading ramp section will pivot upon activation only of said second hydraulic cylinder, to cause said forward end portion of said leading ramp section to raise above a lower storage position for ease of mounting said leading ramp section upon such a draft vehicle, and removal of said leading ramp section from that draft vehicle.

21. The elevationally adjustable ramp defined in claim 17, including a ramp-extension means carried by said rear end portion of said trailing ramp section.

22. The elevationally adjustable ramp defined in claim 21, wherein the combined weight of said ramp-extension means and said trailing ramp section exceeds the weight of said leading ramp section.

23. The elevationally adjustable ramp defined in claim 19, wherein said hydraulic power source is carried by said leading ramp section, and is independent from and devoid of powered connection to such a draft vehicle.

24. The elevationally adjustable ramp defined in claim 19, wherein said trailing ramp section is slightly spaced rearwardly from said leading ramp section adjacent said axis of pivot therebetween to allow for pivotal movement of one of said ramp sections relative to the other in either direction.

25. The elevationally adjustable ramp defined in claim 19, wherein said leading ramp section carries a generally vertically extending support member which depends therefrom at said forward end portion thereof in supporting relation thereto when said foldable ramp is disconnected from such a draft vehicle and moved into a storage position.

26. An elevationally adjustable ramp which, by interior adjustment, is capable of facilitating mounting and disconnection thereof relative to a draft vehicle, comprising:

(a) a foldable ramp having at least a pair of ramp sections, one of said ramp sections constituting a leading section and the other constituting a trailing section;

(b) said leading ramp section having a forward end portion and a rear end portion, said forward end portion being constructed and arranged to be pivotally connected to the draft vehicle in readily removable relation thereto;

(c) said trailing ramp section having a forward end portion and a rear end portion, said forward end portion of said trailing ramp section being pivotally secured to said rear end portion of said leading ramp section, thereby defining an axis of pivot transverse to said ramp about which said leading and trailing ramp sections may pivot for movement between a generally aligned, inclined loading position and a substantially upright, closely parallel traveling position;

(d) a generally vertically extending support member pivotally carried by said forward end portion of said leading ramp section, and depending therefrom in supporting relation thereto when said foldable ramp is removed from such a draft vehicle and placed in a storage position;

(e) a first hydraulic cylinder connected in controlling relation to said leading ramp section to cause controlled pivotal movement of said leading ramp section about said pivotal connection to said support member when connected to such a draft vehicle;

(f) a second hydraulic cylinder connected between said trailing and leading ramp sections to control the relative pivotal movement between said trailing and leading ramp sections;

(g) a hydraulic power source being carried by said support member and controllably connected to said first and second hydraulic cylinders, and constituting therewith an independently hydraulically operable adjustment means for facilitating the mounting upon or removal of said leading ramp section from such a draft vehicle;

(h) a ground-bearing pad pivotally connected to and depending freely from said ramp at a point adjacent said axis of pivot between said leading and trailing ramp sections, and forward of a center of gravity of said ramp, said pad being gravitationally positionable and constructed and arranged to engage the ground and support said ramp sections when said ramp sections are disposed in loading and storing positions; and (i) said ground-bearing pad, when engaging the ground, constituting a fulcrum about which said leading ramp section will pivot upon activation of said second hydraulic cylinder, to cause said forward end portion of said leading ramp section to elevate to a position which facilitates the mounting of said leading ramp section upon, or removal thereof from, such a draft vehicle.

27. The elevationally adjustable ramp defined in claim 26, wherein said first hydraulic cylinder has a base end pivotally connected to said support member, and a piston rod pivotally connected to said rear end portion of said leading section at a point suitable to cause said rear end portion of said leading section to elevate to a vertically extending transport position upon activation and extension of said piston rod of said first hydraulic cylinder.

28. The elevationally adjustable ramp defined in claim 27, wherein said second hydraulic cylinder has a base end pivotally mounted upon a medial portion of said trailing ramp section, and has a piston rod extending therefrom and being pivotally connected to said rear end portion of said leading ramp section to cause relative pivotal movement between said trailing ramp section and said leading ramp section at said axis of pivot therebetween, to thereby bring said ramp sections into generally parallel vertical positions for travel.

29. The elevationally adjustable ramp defined in claim 27, wherein said hydraulic power source of said ramp is devoid of powered connection to said draft vehicle.

* * * * *